United States Patent [19]

Noonan et al.

[11] 4,150,217

[45] Apr. 17, 1979

[54] ANIONIC IMINO-CONTAINING POLYMERIC ADHESIVES FOR PHOTOGRAPHIC MATERIALS

[75] Inventors: John M. Noonan; Robert C. McConkey; Michael J. Hanrahan, all of Rochester, N.Y.

[73] Assignee: Eastman Kodak Company, Rochester, N.Y.

[21] Appl. No.: 857,728

[22] Filed: Dec. 5, 1977

Related U.S. Application Data

[62] Division of Ser. No. 732,628, Oct. 15, 1976.

[51] Int. Cl.[2] .............................................. C08G 63/68

[52] U.S. Cl. ...................................... 528/290; 528/293

[58] Field of Search ................. 260/75 N, 75 S, 47 C, 260/47 CZ, 49; 528/172, 173, 176, 290, 293

[56] References Cited

U.S. PATENT DOCUMENTS

| | | | |
|---|---|---|---|
| 3,515,628 | 6/1970 | Jackson et al. | 156/332 |
| 3,546,180 | 12/1970 | Caldwell et al. | 260/76 |
| 3,929,489 | 12/1975 | Arcesi et al. | 96/115 R |

FOREIGN PATENT DOCUMENTS 1593118 7/1970 France.

*Primary Examiner*—Lucille M. Phynes

*Attorney, Agent, or Firm*—Arthur H. Rosenstein

[57] ABSTRACT

Disclosed herein are heat-activatable adhesive compositions comprising a water-soluble condensation polymer which is characterized by having a glycol component comprising one or more diols, preferably one of which is 1,4-bis(2-hydroxyethoxy)cyclohexane; and an acid component comprising greater than 15 and up to about 35 mole percent of at least one diacid or diester monomer having an iminodisulfonyl salt moiety, and from about 65 to about 85 mole percent of one or more other diacids or diesters. These adhesives are further characterized as having high bonding strengths at temperatures above 50° C. They have been found useful in a variety of photographic materials, and particularly in image transfer film units.

7 Claims, No Drawings

ANIONIC IMINO-CONTAINING POLYMERIC ADHESIVES FOR PHOTOGRAPHIC MATERIALS

This is a division of application Ser. No. 732,628, filed Oct. 15, 1976.

BACKGROUND OF THE INVENTION

1. Field of the Invention

This invention relates to polymeric adhesive compositions and their use in laminates, and particularly photographic elements and processes to obtain a desirable combination of properties. In particular, this invention relates to heat-activatable, water-soluble adhesive compositions capable of bonding hydrophilic surfaces to hydrophobic surfaces in photographic materials. A preferred embodiment of this invention is the use of certain anionic iminodisulfonyl group-containing polymeric adhesives in image transfer film units.

2. Description of the Prior Art

It is well known that certain condensation polymers are useful as adhesives. For instance, U.S. Pat. No. 3,546,008 of Shields et al, issued Dec. 8, 1970 and British Pat. No. 1,237,671 of Kibler et al, published June 30, 1971, disclose water-dissipatable polyesters containing sulfonate salt groups which are useful as sizing and adhesive compositions for textile fibers. Other water-dissipatable or -soluble adhesive compositions containing sulfonate salt groups are described in U.S. Pat. Nos. 3,563,942 of Heiberger, issued Feb. 16, 1971 (in laminates); 3,734,874 of Kibler et al, issued May 22, 1973 (in packaging materials); 3,779,993 of Kibler et al, issued Dec. 18,1973 (in packaging materials); and 3,853,820 of Vachon, issued Dec. 10, 1974 (in textile fibers).

Jackson et al, in U.S. Pat. No. 3,515,628, issued June 2, 1970, disclose highly crystalline condensation polymers made of various mixtures of diols and diacids, particularly phthalic acid derivatives, which are useful as adhesives for metal can seams. Price et al, in U.S. Pat. No 3,700,644 issued Oct. 24, 1972, disclose polyester fibers having an aromatic sulfonamide moiety.

Various condensation and addition polymeric adhesives useful in photographic materials are well known, as disclosed in U.S. Pat. Nos. 2,698,243 of Bachelder et al, issued Dec. 28, 1954; 3,056,491 of Campbell, issued Oct. 2, 1962; 3,256,090 of Booth, issued June 14, 1966; 3,309,201 of Friedman et al, issued Mar. 14, 1967; 3,376,265 of Yokouchi et al, issued Apr. 2, 1968, and 3,511,659 of Dennis et al, issued May 12, 1970.

French Pat. No. 1,593,118, published July 3, 1970 describes a method of making polyesters useful as synthetic textile fibers comprising an anionic iminodisulfonyl moiety. No use of these polyesters as adhesives is disclosed.

Organic solvent-soluble polyesters comprising an acid component made with 1 to 15 mole percent of a diacid containing anionic iminodisulfonyl moieties are disclosed in U.S. Pat. No. 3,546,180 of Caldwell et al, issued Dec. 8, 1970. These polyesters are useful as synthetic textile fibers or as adhesives and films if mixed with small amounts of water-insoluble crosslinked polymers.

Arcesi et al, in U.S. Pat. No. 3,929,489, issued Dec. 30, 1975, describe light sensitive polyesters comprising a diol component which may include 1,4-bis(2-hydroxyethoxy)cyclohexane; and a diacid component comprising from 2 to 45 mole percent of anionic iminodisulfohyl units and up to 55 mole percent of a light sensitive crosslinkable diacid. These polyesters are soluble in organic solvents and aqueous alcoholic alkaline developers and are used in photographic elements such as lithographic printing plates and photoresists. These polyesters are insoluble in distilled water. No use as adhesives in silver halide photographic materials is disclosed.

Image-transfer or diffusion transfer processes are well known in the art. Various formats for color diffusion transfer assemblages are described in U.S. Pat. Nos. 2,352,014 of Root, issued June 20, 1944; 2,543,181 of Land, issued Feb. 27, 1951; 2,983,606 of Rogers, issued May 9, 1961; 3,020,155 of Yackel et al, issued Feb. 6, 1962; 3,227,550 of Whitmore et al, issued Jan. 4, 1966; 3,227,552 of Whitmore, issued Jan. 4, 1966; 3,415,644; 3,415,645; and 3,415,646 all of Land, all issued Dec. 10, 1968; and 3,635,707 of Cole, issued Jan. 18, 1972; Canadian Pat. Nos. 674,082 of Whitmore, issued Nov. 12, 1963 and 928,559 of Cole, issued June 19, 1973; U.S. Pat. Nos. 3,362,819 of Land, issued Jan. 9, 1968; 3,362,821 of Land, issued Jan. 9, 1968; 3,647,437 of Land, issued Mar. 7, 1972; and 3,765,815 of Schlein et al, issued Sept. 4, 1973; Belgian Pat. Nos. 757,959 and 757,960; British Pat. Nos. 904,364 and 840,731; and copending U.S. application Ser. No. 676,945 of Hannie, filed Apr. 14, 1976. None of these references teach or suggest the adhesive compositions disclosed herein or their use in photographic materials.

In these formats, the image-receiving layer containing the photographic image for viewing can be separated from the photographic layers after processing or, in some embodiments, it can remain permanently attached and integral with the image-generating and ancillary layers present in the structure when a transparent support is employed on the viewing side of the assemblage. The image is formed by color-providing substances released from the image-generating units, diffusing through the layers of the structure to the dye image-receiving layer. After exposure of the assemblage, an alkaline processing composition permeates the various layers to initiate development of the exposed photosensitive silver halide emulsion layers. The emulsion layers are developed in proportion to the extent of the respective exposures, and the color-providing materials which are formed or released in the respective image-generating layers begin to diffuse throughout the structure. At least a portion of the imagewise distributed or released color-providing substances migrate to the dye image-receiving layer to form an image of the original subject.

Typically, adhesives are used in image transfer units to bond supports, subbed or unsubbed, to cover sheets or other layers around the edges of the units. Adhesives can also be used to bond subbing layers to supports or cover sheets; photosensitive layers to image-receiving layers; photosensitive layers to cover sheets; and the like. In bonding photosensitive layers to cover sheets and to image-receiving layers, it is sometimes helpful to use masks or spacer rails to separate the layers. The adhesive may then be used to bond the masks over the spacer rail with the layer of the film unit to be bonded.

Most adhesives taught in the art exhibit extremely low binding strengths at elevated temperatures, such as within the range of 50° C. to 90° C. Hence, they must be used at low temperatures, undesirably limiting manufacturing and processing conditions. Further, these prior art adhesives do not satisfactorily bond all types of materials. For instance, some can be used only to bond hydrophilic surfaces, others adhere only to hydrophobic surfaces. Still further, most adhesives known in the art are water-insoluble and must be coated with organic solvents and hardened with drying. These organic solvents are substantially more costly and more burdensome to dispose of after use than aqueous solutions, since, if untreated, they can be ecologically objectionable.

It is evident, then, that there is a need in the photographic arts for water-soluble, heat-activatable adhesives having high bonding strengths over a wide range of temperatures.

SUMMARY OF THE INVENTION

It has been found, according to the present invention, that certain water-soluble condensation polymers are useful in adhesive compositions for photographic materials and laminates. These polymers have high bonding strengths at elevated temperatures and can be used to bond hydrophilic surfaces to hydrophobic surfaces.

One aspect of the present invention is an adhesive composition comprising a water-soluble polyester which comprises a glycol component comprising at least 50 mole percent of an aliphatic diol selected from the group consisting of HO—R—H wherein R is $-(CH_2CH_2O)_n-$, and

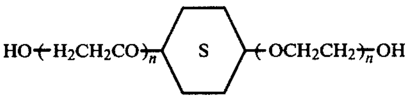

wherein n is an integer from 1 to 4; and an acid component comprising greater than 15 and up to about 35 mole percent of at least one dicarboxylic acid having an iminosulfonyl moiety containing a monovalent cation as an imino nitrogen atom substituent, and from about 65 to about 85 mole percent of one or more other diacids.

In still another aspect of the present invention, a laminated structure comprises a support bonded to a layer by an adhesive composition comprising a water soluble polyester which comprises a glycol component comprising one or more diols; and an acid component comprising greater than 15 and up to about 35 mole percent of at least one dicarboxlyic acid having an iminosulfonyl moiety containing a monovalent cation as an imino nitrogen substituent, and from about 65 to about 85 mole percent of one or more other diacids.

In another aspect of the present invention, a photographic element comprising a support, having thereon at least one photographic silver halide layer and at least one layer comprising an adhesive comprising a water-soluble polyester which comprises a glycol component comprising one or more diols; and an acid component comprising greater than 15 and up to about 35 mole percent of at least one dicarboxylic acid having an iminosulfonyl moiety containing a monovalent cation as an imino nitrogen substituent, and from about 65 to about 85 mole percent of one or more other diacids.

In a further aspect of the present invention, an image transfer unit comprises: a photographic element comprising a support having thereon at least one photographic silver halide layer; at least one layer comprising an adhesive comprising a water-soluble polyester which comprises:

A. a glycol component comprising one or more diols; and

B. an acid component comprising greater than 15 and up to about 35 mole percent of at least one dicarboxylic acid having an iminosulfonyl moiety containing a monovalent cation as an imino nitrogen substituent, and from about 65 to about 85 mole percent of one or more other diacids; and image-receiving layer; and means containing an alkaline processing composition adapted to discharge its contents within said unit.

DETAILED DESCRIPTION OF THE INVENTION

Generally, the water-soluble polyesters useful in the present invention are copolyesters formed by condensing a glycol component of one or more polyhydric alcohols with an acid component of at least two carboxylic acids, each containing at least two condensation sites. It is noted that amido groups can be used as linking groups rather than ester groups. This modification is readily achieved by condensing in the presence of amino alcohols, diamines or amino acids. The carboxylic acids can be condensed in the form of a free acid or in the form of a functional derivative, such as an anhydride, a lower alkyl ester or an acid halide.

The polyhydric alcohols of the polyester glycol component capable of condensing with a carboxylic acid or functional derivative thereof are diols of the formula HO—R—OH wherein R′ is a divalent organic radical generally having from about 2 to 40 carbon atoms and including hydrogen and carbon atoms, and optionally, ether oxygen atoms. Exemplary preferred R′ radicals include hydrocarbon radicals, such as straight and branched chain alkylene radical (e.g. ethylene, trimethylene, neopentylene, etc.), cycloalkylene radicals (e.g. cyclohexylene, cycloheptylene, etc.), and arylene radicals (e.g. phenylene); and hydrocarbon-oxyhydrocarbon radicals, such as alkylene-oxy-alkylene, alkylene-oxycycloalkylene-oxyalkylene, and the like. Exemplary diols that can be utilized in preparing the condensation polyesters useful in this invention include ethylene glycol, diethylene glycol, 1,3-propanediol, 1,4-butanediol, 1,5-pentanediol, 1,6-hexanediol, 1,7-heptanediol, 1,8-octanediol, neopentyl glycol, 2,2-diethyltrimethylene glycol, 1,3-cyclohexane dimethanol, 1,4-cyclohexane dimethanol, triethylene glycol, tetraethylene glycol, 2,3-norbornanediol, 2,5(6)-norboranediol and the like. The corresponding diamines can, if desired, be substituted for the diols in forming condensation copolymers useful in the present invention. One or a mixture of diols and/or diamines can be used also.

In a preferred embodiment, the glycol component of the polyesters described herein promotes desirable water solubility by comprising at least 50 mole percent of an aliphatic diol having the formula (1) HO—R—H wherein R is selected from the group consisting of $-(CH_2CH_2O)_n-$ or a diol having the formula (II)

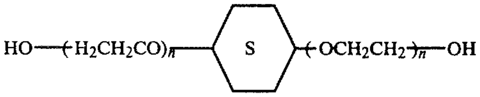

wherein n is an integer from 1 to 4. Exemplary of such diols are 1,4-bis(2-hydroxyethoxy)cyclohexane, 1,4-bis(2-hydroxypropoxy)cyclohexane, 1,4-bis(2-hydroxybutoxy)cyclohexane, diethylene glycol, triethylene glycol, tetraethylene glycol and the like. Up to 50 mole percent of the glycol component can comprise one or more other diols as described hereinabove.

Greater than 15 and up to about 35 mole percent, and preferably from about 20 to about 30 mole percent, of the acid component is at least one dicarboxylic acid having an iminosulfonyl moiety containing a monovalent cation as an imino nitrogen atom substituent. In a preferred embodiment of the present invention, these dicarboxylic acids have an iminosulfonyl moiety represented by the formula (III):

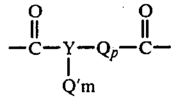

wherein m and p are integers whose sum equals 1; Q is defined by the formula (IV):

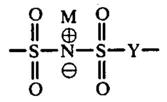

Q′ is selected from the group consisting of (V) and (VI):

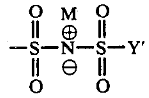 and 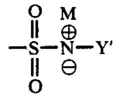

(V) (VI)

wherein Y is arylene or arylidene, preferably having from 6 to 12 carbon atoms, such as phenylene, naphthylene, phenylidine, naphthylidyne, and the like, all of which may be substituted with alkyl having from 1 to 4 carbon atoms, such as methyl, ethyl, and the like, halide, such as fluoride, chloride, bromide and the like, and other substituents known to those in the art which will not interfere with the desired properties of the resulting copolyesters; Y′ is substituted or unsubstituted aryl, preferably having from 6 to 12 carbon atoms, such as phenyl, naphthyl, tolyl, and the like; or substituted or unsubstituted alkyl, preferably having from 1 to 7 carbon atoms, such as methyl, ethyl, propyl, methylphenyl, and the like; and M is a solubilizing cation and preferably a monovalent cation such as an alkali metal, ammonium cation or hydrogen.

Exemplary compounds having an iminosulfonyl moiety include 3,3′-[(sodioimino)disulfonyl]dibenzoic acid; 3,3′-[(potassioimino)disulfonyl]dibenzoic acid; 3,3′-[(lithioimino)disulfonyl]dibenzoic acid; 4,4′-[(lithiomino)-disulfonyl]-dibenzoic acid; 4,4′-[(sodioimino)disulfonyl]dibenzoic acid; 4,4′-[(potassioimino)disulfonyl]-dibenzoic acid; 3,4′-[(lithioimino)disulfonyl]dibenzoic acid; 3,4′-[(sodioimino)disulfonyl]-dibenzoic acid; 5-[4-chloronapth-1-ylsulfonyl-(sodioimino)-sulfonyl]isophthalic acid; 4,4′-[(potassioimino)disulfonyl]-dinaphthoic acid; 5-[p-tolylsulfonyl-(potassioimino)-sulfonyl]-isophthalic acid; 4-[p-tolylsulfonyl-(sodioimino)-sulfonyl]-1,5-naphthalene dicarboxylic acid; 5-[n-hexylsulfonyl-(lithioimino)-sulfonyl]isophthalic acid; 2-[phenylsulfonyl-(potassioimino)-sulfonyl]terephthalic acid and functional derivatives thereof. These and other dicarboxylic acids are disclosed in U.S. Pat. No. 3,546,180 of Caldwell et al, issued Dec. 8, 1970, and U.S. Pat. No. 3,929,489 of Arcesi et al, issued Dec. 30, 1975, the disclosures of which are herein incorporated by reference.

A preferred iminosulfonyl compounds is 3,3′-[(sodioimino)disulfonyl]dibenzoic acid or an equivalent benzoate such as the dimethyl benzoate.

From about 65 to about 85 mole percent of the acid component of the polyesters useful in the present invention is one or more other diacids or functional derivatives thereof. Exemplary of such diacids are aromatic dicarboxylic acids, such as phthalic acid, isophthalic acid, terephthalic acid and the like; aliphatic dicarboxylic acids such as malonic, succinic, glutaric, adipic, pimelic, suberic, azelaic, sebacic and other higher homolog dicarboxylic acids which may be aryl- or alkyl-substituted; carbocyclic dicarboxylic acids, such as 1,3-cyclohexanedicarboxylic acid, 1,4-cyclchexanedicarboxylic acid, and the like; heterocyclic dicarboxylic acids, such as 1,4-piperazinylenedicarboxylic acid, and the like; and light senstive ethylenically unsaturated dicarboxylic acids, such as cinnamylidenemalonic acid, p-phenylenebisacrylic acid, and the like as disclosed in U.S. Pat. No. 3,929,489 of Arcesi et al. Mixtures of these acids can be employed if desired.

Copolyesters preferred in the practice of this invention include poly[1,4-cyclohexylenebis(oxyethylene)-co-dimethyl sodioiminobis(sulfonyl-m-benzoate)-co-diethyl succinate] (100 mole percent glycol; 30:70 mole ratio dicarboxylic ratio); poly[1,4-cyclohexylenebis(oxyethylene)-co-dimethyl sodioiminobis(sulfonyl-m-benzoate)-co-adipic acid] (100 mole percent glycol; 30:70 mole dicarboxylate ratio); and poly[1,4-cyclohexylenebis(oxyethylene)-co-dimethyl 1,4-cyclohexanedicarboxylate-co-adipic acid-co-dimethyl sodioiminobis(sulfonyl-m-benzoate)] (100 mole percent glycol; 35:35:30 dicarboxylate ratio).

The condensation polyester described herein can be prepared by procedures well known in the art for making linear condensation polymers, particularly interfacial, solution or ester interchange procedures, the latter being preferred. Reaction times are a function of all other variables, and, as such are governed by the inherent viscosity desired for the resulting polymer.

When employing interfacial procedures, polymerization is carried out in suitable halogenated solvents, such as methylene chloride, chloroform, dichloroethane, propylene dichloride, and the like. Reaction temperatures are governed by maintenance of a practical rate of reaction and the boiling point of the solvent with a range of 10 to 40° C. being suitable.

Solution polymerization procedures can be carried out by condensing suitable acid halides, such as chlorides, of the dicarboxylates to be incorporated with the desired diols in a suitable solvent, such as terephthaloyl, isophthaloyl, hexahydrocyclohexanedicarboxyl chlorides, and the like, in the presence of a suitable acid acceptor, such as pyridine, triethylamine, tripropylamine, and the like. The acid acceptor can be employed in excess to serve as the solvent.

The preferred mode of preparing the polyesters disclosed herein is the ester interchange procedure either by melt or powder process, and preferably by the melt process. The diols of the glycol component and the carboxylates of the acid component are heated to a melt on an approximately equal molar basis and treated with a transesterification catalyst such as alkali or alkaline earth metal carbonates, oxides, hydroxides, hydrides, and alkoxides; or compounds of a Group IVB metal of the Periodic Table, such as tetraisopropyl orthotitanate, butyl titanate, organo-metallic halides, and complex alkoxides such as $NaHTi(OC_4H_9)_2$, and the like. As a practical matter, it is frequently desirable to utilize an excess of up to about 80 molar percent of the glycol component in the reaction mixture. Low boiling alcohols are removed by distillation during polymerization.

Typically, it is desirable that the condensation copolymers described herein exhibit an inherent viscosity of from about 0.15 to about 0.90 and preferably, from 0.2 to 0.8, as measured at 25° C. at a concentration of 0.25 g/deciliter in a 1:1 mixture of phenol and chlorobenzene. As used herein, the term inherent viscosity is determined by the formula $$\eta_i = (2.30 \log \eta r)/C$$

wherein $\eta i$ is the inherent viscosity; $\eta r$ is the relative viscosity of a phenol:chlorobenzene solution of the polymer divided by the viscosity of the phenyl:chlorobenzene mixture in the same units; and C is the concentration in grams of polymer per 100 cc of solution.

Also typically, it is desirable that the polymers described herein have a glass transition temperature within the range of about 20° C. to about 50° C. Generally, this range provides optimum bonding strengths in adhesive compositions at sealing temperatures above 90° C. and preferably between about 90° C. and about 150° C. The glass transition temperatures (Tg), as used herein, unless otherwise specified, can be determined by differential scanning colorimetry as disclosed in "Techniques and Methods of Polymer Evaluation," Vol. 2, Marcel Dekker, Inc., N.Y., 1970.

The polyester adhesives described herein are water-soluble, meaning that they will dissolve in distilled water to the extent of at least 20 percent by weight at ambient conditions. Such aqueous solutions are coated on an appropriate substrate and dried to produce a clear film.

The water-soluble polyester adhesives described herein can be used in a variety of photographic silver halide elements including radiographic elements, direct-positive elements, negative image-forming elements, thermally processable elements, multilayer multi-color elements, high contrast elements and the like. The resulting photographic elements are panchromatic or orthochromatic. Other typical elements and suitable photographic silver halide emulsions are disclosed in *Product Licensing Index,* Vol. 92, Dec., 1971, publication 9232, pp. 107-110, hereby incorporated by reference.

Suitable silver halide emulsions are disclosed in paragraphs I and II of *Product Licensing Index,* cited above. The silver halide emulsions can contain various addenda and vehicles as disclosed in paragraphs III-VIII and XI-XVI. They may be coated on various supports as described in paragraph X. The photographic layer or layers can be present in combination with one or more conventional subbing layers, interlayers, overcoats and the like.

The photographic elements of the present invention can be prepared and processed by any convenient conventional technique. Illustrative preparation techniques are disclosed in *Product Licensing Index,* cited above, paragraphs XVII and XVIII; and exemplary processing techniques are disclosed in paragraph XXIII.

The adhesives disclosed herein can be used in any layer of a photographic element wherein an adhesive is useful. One use would be as subbing layers to render hydrophilic proteinaceous compositions of emulsion layers adherent to hydrophobic element supports, as described in U.S. Pat. No. 3,658,541 of Jacoby et al, issued Apr. 25, 1972. Other uses can be determined from general knowledge of the photographic art possessed by a worker of ordinary skill in the art. Typical coating concentrations of the adhesives in various applications would be in the range of from about 8 grams to about 24 grams per square meter of support.

A preferred embodiment of the present invention is an image transfer unit comprising:

a photographic element comprising a support having thereon at least one photographic silver halide layer;

at least one layer comprising an adhesive comprising a water-soluble polyester described hereinabove;

an image receiving layer; and means containing an alkaline processing composition adapted to discharge its contents with said unit.

The image transfer unit or film unit can further comprise a dye image-providing material in association with the silver halide emulsion layer; a neutralizing layer for neutralizing the alkaline processing composition; a barrier or timing layer positioned between the neutralizing layer and the silver halide layer, and a cover sheet. These units are more fully disclosed in copending U.S. application Ser. No. 676,945 of Hanrie, filed Apr. 14, 1976.

The polyester adhesives disclosed herein can be used anywhere in image transfer units where there is a need to bond two layers of materials. Preferably, the adhesives are used to close the entire film unit, i.e., to bond the subbed or unsubbed support to a cover sheet during manufacture of the film unit as described in U.S. application Ser. No. 676,945 of Hannie noted hereinabove. The adhesives are also useful when bonding hydrophilic subbing layers to hydrophobic layers such as film support surfaces including poly(ethylene terephthalate), cellulose acetate butyrate and the like. However, the adhesives disclosed herein also bond strongly to metals, such as aluminum, steel, lead, tin, copper and the like; glass, ceramics, wood and other plastics known to those skilled in the photographic arts.

Still another use for the polyester adhesives disclosed herein is to reseal edges of image transfer units after dispensation of the processing composition within the unit and separation of the unit from the means adapted to discharge the processing solution.

Still another use of these adhesives is to bond a suitable barrier or timing layer to a support material which may be either the photographic element support or a cover sheet for the entire film unit.

The adhesive compositions disclosed herein are usually coated in a film on one or both layers to be bonded such as a subbed support in a concentration range of from about 8 grams to about 24 grams per square meter of support. Alternatively, the compositions may be applied as a melt at temperatures ranging from 125°to 260° C.

The adhesives can be coated as an aqueous solution of from about 80 to about 140 grams adhesive per liter of solution at from about 35 to about 65 mil wet thickness, dried for from about 0.5 to about 1.5 minutes at from about 40 to about 100° C. The resulting adhesive coating can be then sealed to various substrates at a temperature of from about 65 to about 140° C. and a pressure of from about 100 to about 1500 mm Hg.

Adhesives which are light sensitive can be exposed for about 10 seconds to about 20 minutes to a light source such as a 200 watt high pressure mercury vapor light, xenon lamp, carbon arc and the like, before the sealing operation.

Certain organic solvents can also be used to coat the adhesives disclosed herein. Exemplary of such are chlorinated solvents, such as trichloroethylene, dimethylformamide and the like. A typical concentration range is from about 1 to about 200 grams adhesive per liter of solution.

In one embodiment according to this invention, the units are integral negative-receiver color diffusion transfer film units in which an adhesive composition of the invention can be coated on a cover sheet.

In this embodiment, the support for the photosensitive element is transparent and is coated with the image-receiving layer, an opaque white-reflective layer, a black opaque layer and photosensitive layers having associated therewith dye image-providing materials. A rupturable container containing an alkaline processing composition and an opacifier such as carbon black is positioned adjacent the top layer and a transparent cover sheet. The cover sheet comprises a transparent support which is coated with a neutralizing layer and a timing or barrier layer. The film unit is placed in a camera, exposed through the transparent cover sheet and then passed through a pair of pressure-applying members in the camera as it is being removed therefrom. The pressure-applying members rupture the container and spread processing composition and opacifier over the image-forming portion of the film unit. The silver halide layers are developed and dye images are formed as a function of development, and the dyes diffuse to the image-receiving layer to provide an image which is viewed through the transparent support on the opaque reflecting layer background. The timing layer breaks down after a period of time and makes available materials to neutralize the alkaline processing composition and to shut down further silver halide development. For further details concerning the format of this particular integral film unit, reference is made to Canadian Pat. No. 928,559, which is incorporated herein by reference.

Another embodiment of a film unit is an integral color diffusion transfer film unit in which the adhesives of the invention can be employed on the film support. In this embodiment, the photosensitive compound comprises an opaque support which is coated with an adhesive layer which is coated with photosensitive layers having associated therewith dye image-providing material layers. A rupturable container containing an alkaline processing composition, $TiO_2$ and an indicator dye (see U.S. Pat. No. 3,647,437) is positioned adjacent the top layer and a transparent receiver. The receiver comprises a transparent support which is coated with a neutralizing layer, a timing layer and an image-receiving layer. The film unit is placed in a camera, exposed through the transparent receiver and then passed through a pair of pressure-applying members in the camera as it is being removed therefrom. The pressure-applying members rupture the container and spread processing composition, $TiO_2$ and indicator dye over the image-forming portion of the film unit to protect it from exposure. The processing composition develops each silver halide layer and an imagewise distribution of diffusible dye remains in areas which are not developed, and said dye diffuses to the image-receiving layer where it can be viewed through the transparent support on a white background, the indicator dye having "shifted" to a colorless form as the alkali is consumed by the neutralizing layer. As before, the neutralizing layer then neutralizes the alkaline processing composition after the timing layer breaks down. For further details concerning the format of this particular film unit, reference is made to U.S. Pat. No. 3,415,644, which is incorporated herein by reference.

Another embodiment of a color diffusion transfer system in which the adhesives of this invention can be employed in a dye image-receiving element is described in U.S. Pat. No. 3,362,819. The image-receiving element comprises a support, which can be opaque, having thereon a neutralizing layer, a timing layer and a dye image-receiving layer. For further details concerning the use of such an element in color transfer film units, reference is made to the abovementioned U.S. Pat. No. 3,362,819, which is incorporated herein by reference.

Still other useful integral formats in which this invention can be employed are described in U.S. Pat. Nos. 3,415,645, 3,415,646, 3,647,437, 3,635,707 and 3,594,165 and British Pat. No. 1,330,524.

The photographic element useful in this invention can be treated with an alkaline processing composition to effect or initiate development in any manner. A preferred method for applying processing composition is by use of a rupturable container or pod which contains the composition. In general, the processing composition employed in this invention contains the developing agent for development, although the composition could also just be an alkaline solution where the developer is incorporated in the photosensitive element, in which case the alkaline solution serves to activate the incorporated developer.

The dye image-providing materials which may be employed in this invention generally may be characterized as either (1) initially soluble or diffusible in the processing composition but are selectively rendered nondiffusible in an imagewise pattern as a function of development, such as those disclosed, for example, in U.S. Pat. Nos. 2,647,049, 2,661,293, 2,698,244, 2,698,798, 2,802,735, 2,774,668 and 2,983,606 or (2) initially insoluble or nondiffusible in the processing composition but which provide a diffusible image dye-providing material as a function of development, such as those disclosed, for example, in U.S. Pat. Nos. 3,227,550, 3,227,551, 3,227,552, 3,227,554, 3,243,294 and 3,445,228. These materials may contain preformed dyes or dye precursors, e.g., color couplers, oxichromic compounds and the like.

In a preferred embodiment of this invention, the dye image-providing material is a ballasted redox dye releaser. Such compounds are, generally speaking, compounds which can be oxidized, i.e., crossoxidized by an oxidized developing agent, to provide a species which as a function of oxidation will release a diffusible dye, such as by alkaline hydrolysis. Such redox dye releasers are described in U.S. Pat. Nos. 3,725,062 by Anderson and Lum issued Apr. 3, 1973, 3,698,897 by Gompf and Lum issued Oct. 17, 1972, 3,628,952 by Puschel et al issued Dec. 21, 1971, 3,443,939 by Bloom et al issued May 13, 1969, and 3,443,940 by Bloom et al issued May 13, 1969, and the following copending applications: Ser. Nos. 351,673 of Fleckenstein et al, published Jan. 28, 1975 and 351,700 of Fleckenstein, both filed Apr. 16, 1973; 331,727 and 331,729 of Landholm et al, both filed Feb. 12, 1973; 331,728 of Haase et al filed Feb. 12, 1973; and 326,628 of Hinshaw et al filed January 26, 1973; the disclosures of which are hereby incorporated by reference.

The term "nondiffusible" as used throughout the specification is intended to mean that the material will not substantially diffuse either within or from the layer in which it is located within the photographic element.

In most instances, the materials are ballasted so as to render them nondiffusible. Likewise, the term "diffusible" is intended to mean that the material will substantially migrate from its layer in the photographic element in the presence of an alkali solution having a high pH such as 11 or greater to the image-receiving layer where it is mordanted.

In one preferred embodiment of this invention, the redox dye releasers in the Fleckenstein et al application Ser. No. 351,673 referred to above are employed. Such compounds are nondiffusible sulfonamido compounds which are alkali-cleavable upon oxidation to release a diffusible sulfonamido dye. In certain preferred embodiments, the compounds have the formula:

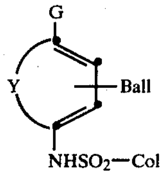

wherein:

(1) Col is a dye or dye precursor moiety;

(2) Ballast is an organic ballasting group (preferably containing at least 8 carbon atoms) which renders said compound nondiffusible in a photographic element during processing of said element with an alkaline composition;

(3) Y represents the carbon atoms necessary to complete a benzene or naphthalene nucleus; and (4) G is Or or $NHR_1$ wherein R is hydrogen or a hydrolyzable moiety and $R_1$ is hydrogen or a substituted or unsubstituted alkyl group of 1 to 22 carbon atoms, such as methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, docosyl, benzyl, phenethyl, etc. (when $R_1$ is an alkyl group of greater than 6 carbon atoms, it can serve as a partial or sole Ballast group).

For further details concerning the above-described sulfonamido compounds and specific examples of same, reference is made to the above-mentioned Fleckenstein et al application Ser. No. 351,673 and Belgian Pat. No. 799,268 issued Feb. 28, 1972, the disclosure of which are hereby incorporated by reference.

Sulfonamido compounds which can be employed in this invention include the following:

Compound 1

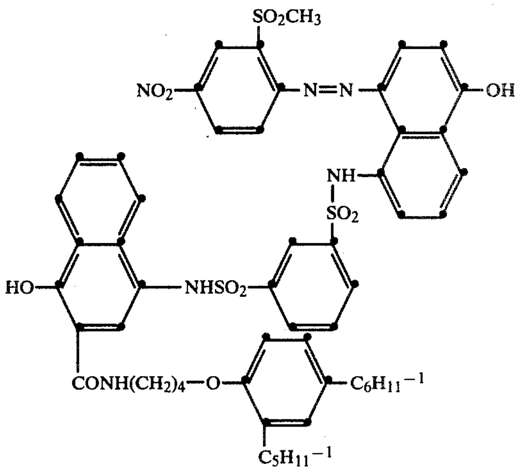

Compound 2

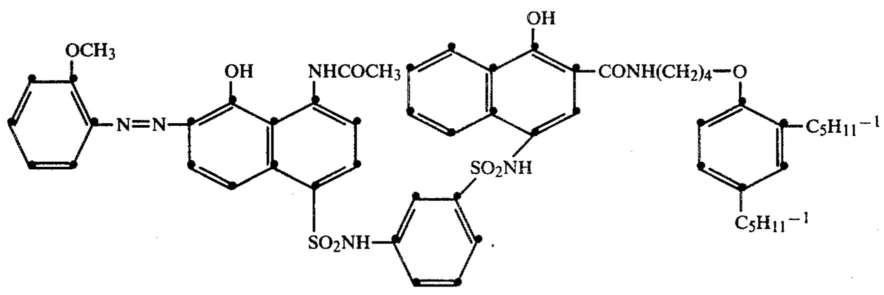

-continued

Compound 3

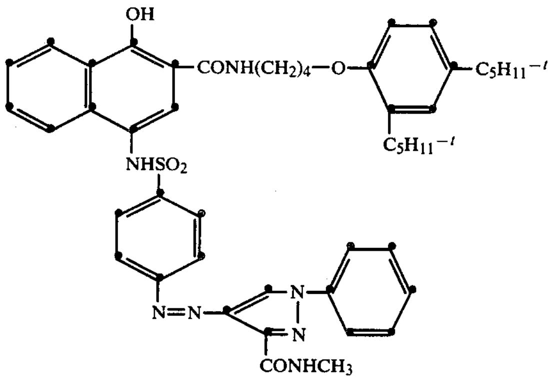

Compound 4

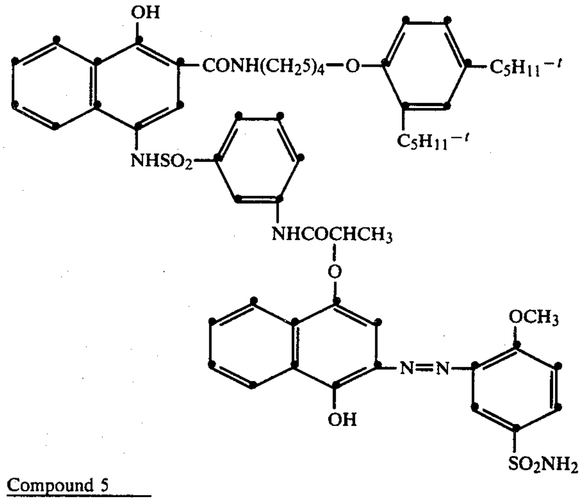

Compound 5

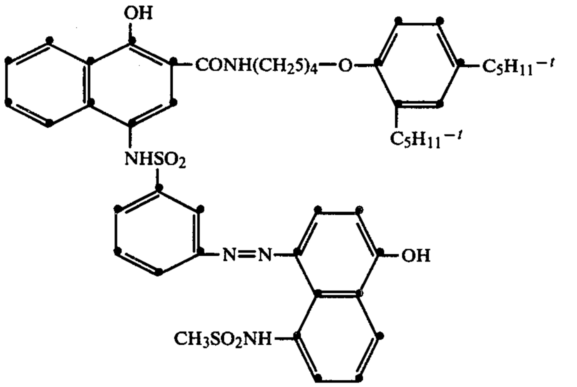

In another preferred embodiment of this invention initially diffusible dye image-providing materials are employed such as dye developers, including metal complexed dye developers such as those described in U.S. Pat. Nos. 3,453,107, 3,544,545, 3,551,406, 3,563,739, 3,597,200 and 3,705,184, and oxichromic developers as described and claimed in U.S. Pat. No. 3,880,658 by Lestina and Bush issued Apr. 29, 1975, the disclosure of which are hereby incorporated by reference. When oxichromic developers are employed, the image is formed by the diffusion of the oxichromic developer to the dye image-receiving layer where it undergoes chromogenic oxidation to form an image dye.

The film unit of the present invention may be used to produce positive images in single- or multicolors, as well as in black and white. In a three-color system, each silver halide emulsion layer of the film assembly will have associated therewith a dye image-providing material capable of providing a dye having a predominant spectral absorption within the region of the visible spectrum to which said silver halide emulsion is sensitive, i.e., the blue-sensitive silver halide emulsion layer will have a yellow dye image-providing material associated therewith, the green-sensitive silver halide emulsion layer will have a magenta dye image-providing material associated therewith, and the red-sensitive silver halide emulsion layer will have a cyan dye image-providing material associated therewith. The dye image-providing material associated with each silver halide emulsion layer may be contained either in the silver halide emulsion layer itself or in a layer continguous the silver halide emulsion layer.

The concentration of the dye image-providing materials that are employed in the present invention may be varied over a wide range, depending upon the particular compound employed and the results which are desired. For example, the dye image-providing compounds may be coated as dispersions in layers by using coating compositions containing a weight ratio between about 0.25 and about 4 of the dye image-providing compound to the hydrophilic film-forming natural material or synthetic polymer binder, such as gelatin, polyvinyl alcohol, etc., which is adapted to be permeated by aqueous alkaline processing composition.

Generally, most silver halide developing agents can be employed to develop the silver emulsions in the photographic elements of this invention. The developer may be employed in the photosensitive element to be activated by the alkaline processing composition. Specific examples of developers which can be employed in this invention includes:

hydroquinone
N-methylaminophenol
Phenidone (1-phenyl-3-pyrazolidinone)
dimzone (1-phenyl-4,4-dimethyl-3-pyrazolidinone) aminophenols
N-N-diethyl p-phenylenediamine
3-methyl-N,N-diethyl-p-phenylenediamine
N,N,N', N'-tetramethyl-p-phenylenediamine
4-hydroxymethyl-4-methyl-1-phenyl-3-pyrazolidinone, etc.

In using redox dye releaser compounds in this invention, the production of diffusible dye images is produced as a function of development of the silver halide emulsions. If the silver halide emulsion employed forms a direct-positive silver image, such as a direct-reversal internal-image emulsion or a solarizing emulsion, which is developable in unexposed areas, a positive image can be obtained on the dye image-receiver layer when redox releasers are employed which release dye where oxidized. After exposure of the film unit, the alkaline processing composition permeates the various layers to initiate development in the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then crossoxidizes the redox dye releaser compound, the oxidized form of which either releases directly or undergoes a base-catalyzed reaction to release the preformed dyes or the dye precursors imagewise as a function of the imagewise exposure of each of the silver halide emulsion layers. At least a portion of the imagewise distributions of diffusible dyes or dye precursors diffuse to the image-receiving layer to form a positive image of the original subject.

Internal-image silver halide emulsions useful in the above-described embodiment are direct-positive emulsions that form intent images predominantely inside the silver halide grains, as distinguished from silver halide grains that form latent images predominantly on the surface thereof. Such internal-image emulsions were described by Davey et al in U.S. Pat. No. 2,592,250 issued Apr. 8, 1952, and elsewhere in the literature. Other useful emulsions are described in U.S. Pat. No. 3,761,276, 3,761,266 and 3,761,267, all issued Sept. 25, 1973. Internal-image silver halide emulsions can be defined in terms of the increased maximum density obtained when developed to a negative silver image with "internal-type" developers over that obtained when developed with "surface-type" developers. Suitable internal-image emulsions are those which, when measured according to normal photographic techniques by coating a test portion of the silver halide emulsion on a transparent support, exposing to a light-intensity scale having a fixed time between 0.01 and 1 second, and developing for 3 minutes at 20° C. in Developer A below ("internal-type" developer), have a maximum density at least 5 times the maximum density obtained when an equally exposed silver halide emulsion is developed for 4 minutes at 20° C. in Developer B described below ("surface-type" developer). Preferably, the maximum density in Developer A is at least 0.5 density unit greater than the maximum density in Developer B.

| | |
|---|---|
| Developer A | |
| hydroquinone | 15 g |
| monomethyl-p-aminophenol sulfate | 15 g |
| sodium sulfite (desiccated) | 50 g |
| potassium bromide | 10 g |
| sodium hydroxide | 25 g |
| sodium thiosulfate | 20 g |
| water to make 1 liter | |
| Developer B | |
| p-hydroxyphenylglycine | 10 g |
| sodium carbonate | 100 g |
| water to make 1 liter | |

The internal-image silver halide emulsions when processed in the presence of fogging or nucleating agents provide direct-positive silver images. Such emulsions are particularly useful in the above-described embodiment. Suitable fogging agents include the hydrazines disclosed in U.S. Pat. No. 2,588,982 by Ives issued Mar. 11, 1952, and 2,563,785 issued Apr. 7, 1951; the hydrazides and hydrazones disclosed by Whitmore, U.S. Pat. 3,227,552 issued Jan. 4, 1966; hydrazone quaternary salts described in British Pat. No. 1,283,835 and U.S. Pat. No. 3,615,615; hydrazone-containing polymethine dyes described in U.S. Pat. No. 3,718,470 and the fogging agents disclosed in copending applications Ser. Nos. 601,891 and 601,888 of Leone et al filed Aug. 6, 1975 both now abandoned, or mixtures thereof. The quantity of fogging agent employed can be widely varied depending upon the results desired. Generally, the concentration of fogging agent is from about 0.4 to about 8 g/mole of silver in the photosensitive layer in the photosensitive element or from about 0.1 to about 2 b/liter of developer if it is located in the developer. The fogging agents described in U.S. Pat. Nos. 3,615,615 and 3,718,470, however, are preferably used in concentrations of 50 to 400 mg/mole of silver in the photosensitive layer.

Typical useful direct-positive emulsions are disclosed in U.S. Pat. Nos. 3,227,552 by Whitmore issued Jan. 4, 1966, 3,761,276 by Evans issued Sept. 25, 1973, 3,761,267 by Gilman et al, 3,761,266 by Milton, 3,703,584 by Motter, and the like.

In other embodiments, the direct-positive emulsions can be emulsions which have been fogged either chemically or by radiation on the surface of the silver halide grains to provide for development to maximum density without exposure. Upon exposure, the exposed areas do not develop, thus providing for image discrimination and a positive image. Silver halide emulsions of this type are very well-known in the art and are disclosed, for example, in U.S. Pat. Nos. 3,367,778 by Berriman issued Feb. 6, 1968, and 3,501,305, 3,501,306 and 3,501,307 by Illingsworth, all issued Mar. 17, 1970.

In still other embodiments, the direct-positive emulsions can be of the type described by Mees and James, *The Theory of the Photographic Process,* published by MacMillan Company, New York, N.Y., 1966, pp. 149–167.

The various silver halide emulsion layers of a color film assembly of the invention can be disposed in the usual order, i.e., the blue-sensitive silver handle emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layer for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in this invention can be of the type disclosed in U.S. Pat. Nos. 2,543,181, 2,643,886, 2,653,732, 2,723,051, 3,056,492, 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

In a color photographic film unit according to this invention, each silver halide emulsion layer containing a dye image-providing material or having the dye image-providing material present in a contiguous layer may be separated from the other silver halide emulsion layers in the negative portion of the film unit by materials including gelatin, calcium alginate, or any of those disclosed in U.S. Pat. No. 3,384,483, polymeric materials such as polyvinylamides as disclosed in U.S. Pat. No. 3,421,892, or any of those disclosed in French Pat. No. 2,028,236 or U.S. Pat. Nos. 2,992,104, 3,043,692, 3,044,873, 3,061,428, 3,069,263, 3,069,264, 3,121,011 and 3,427,158.

Generally speaking except where noted otherwise, the silver halide emulsion layers in the invention comprise photosensitive silver halide dispersed in gelatin and are about 0.25 to 5 microns in thickness; the dye image-providing materials are dispersed in an aqueous alkaline solution-permeable polymeric binder, such as gelatin, as a separate layer about 0.25 to 5 microns in thickness; and the alkaline solution-permeable polymeric interlayers, e.g., gelatin, are about 0.25 to 5 microns in thickness. Of course, these thicknesses are approximate only and can be modified according to the product desired.

The alkaline solution-permeable, light-reflective layer employed in certain embodiments of photographic film units of this invention can generally comprise any opacifier dispersed in a binder as long as it has the desired properties. Particularly desirable are white light-reflective layers since they would be esthetically pleasing backgrounds on which to view a transferred dye image and would also possess the optical properties desired for reflection of incident radiation. Suitable opacifying agents include titanium dioxide, barium sulfate, zinc oxide, barium stearate, silver flake, silicates, alumina, zirconium oxide, zirconium acetyl acetate, sodium zirconium sulfate, kaolin, mica, or mixtures thereof in widely varying amounts depending upon the degree of opacity desired. The opacifying agents may be dispersed in any binder such as an alkaline solution-permeable polymeric matrix, such as, for example, gelatin, polyvinyl alcohol, and the like. Brightening agents such as the stilbenes, coumarins, triazines and oxazoles can also be added to the light-reflective layer, if desired. When it is desired to increase the opacifying capacity of the light-reflective layers, dark-colored opacifying agents, e.g., pH-indicator dyes may be added to it, or carbon black, nigrosine dyes, etc., may be coated in a separate layer adjacent the light-reflective layer.

The neutralizing layer employed in this invention which becomes operative after permeation of the processing composition through the timing layer will effect a reduction in the pH of the image layers from about 13 or 14 to at least 11 and preferably 5–8 within a short time after imbibition. For example, polymeric acids as disclosed in U.S. Pat. No. 3,362,819 or solid acids or metallic salts, e.g., zinc acetate, zinc sulfate, magnesium acetate, etc., as disclosed in U.S. Pat. No. 2,584,030 may be employed with good results. Such neutralizing or pH-lowering materials reduce the pH of the film unit after development to terminate development and substantially reduce further dye transfer and thus stabilize the dye image.

Any material can be employed as the image-receiving layer in this invention as long as the desired function of mordanting or otherwise fixing the dye images will be obtained. The particular material chosen will, of course, depend upon the dye to be mordanted. If acid dyes are to be mordanted, the image-receiving layer can contain basic polymeric mordants such as polymers of amino guanidine derivatives of vinyl methyl ketone such as described by Minsk U.S. Pat. No. 2,882,156 issued Apr. 14, 1959, and basic polymeric mordants such as described in U.S. Pat. Nos. 3,709,690, 3,625,694, 3,898,088 of Cohen et al issued Aug. 5, 1975, and 3,859,096 of Burness et al issued Jan. 7, 1975. Other mordants useful in this invention include poly-4-vinylpyridine, the 2-vinyl pyridine polymer metho-p-toluene sulfonate and similar compounds described by Sprague et al, U.S. Pat. No. 2,484,430 issued Oct. 11, 1949, and cetyl trimethylammonium bromide, etc. Effective mordanting compositions are also described in U.S. Pat. Nos. 3,271,148 by Whitmore; 3,271,147 by Bush, both issued Sept. 6, 1966; and U.S. Pat. No. 3,958,995 of Campbell et al.

Other materials useful in the dye image-receiving layer include alkaline solution-permeable polymeric layers such as N-methoxymethyl polyhexylmethylene adipamide, partially hydrolyzed polyvinyl acetate, and other materials of a similar nature. Generally, good results are obtained when the image-receiving layer, preferably alkaline solution-permeable, is transparent and about 2.5 to about 5$\mu$ in thickness. This thickness, of course, can be modified depending upon the result desired. The image-receiving layer can also contain ultraviolet-absorbing materials to protect the mordanted dye images from fading due to ultraviolet light, and brightening agents such as the stilbenes, coumarins, trazines, oxazoles, dye stabilizers such as the chromanols, alkylphenols, etc.

The alkaline processing composition employed in this invention is the conventional aqueous solution of an alkaline material, e.g., sodium hydroxide, sodium carbonate or an amine such as diethylamine, preferably processing at a pH in excess of 11, and preferably containing a developing agent as described previously. The solution also preferably contains a viscosity-increasing compound such as a high-molecular-weight polymer, e.g., a water-soluble ether inert to alkaline solutions such as hydroxyethyl cellulose or alkali metal salts of carboxymethyl cellulose such as sodium carboxymethyl cellulose. A concentration of viscosity-increasing compound of about 1 to about 5% by weight of the processing composition is preferred which will impart thereto a viscosity of about 100 cps. to about 200,00 cps. In certain embodiments of this invention, an opacifying agent, e.g., $TiO_2$, carbon black, indicator dyes, etc., may be added to the processing composition. In addition, ballasted indicator dyes and dye precursors may also be present in the photographic film unit as a separate layer on the exposure side of the photosensitive layers, the indicator dyes being preferably transparent during exposure and becoming colored or opaque after contact with alkali from the processing composition.

The support for the photographic elements of this invention can be any material as long as it does not deleteriously effect the photographic properties of the film unit and is dimensionally stable. Typical flexible sheet materials include cellulose nitrate film, cellulose acetate film, poly(vinyl acetal) film, polystyrene film poly(ethylene terephthalate) film, polycarbonate film, poly-α-olefins such as polyethylene and polypropylene film, and related films or resinous materials. The support is usually about 2 to 9 mils (50–225μm) in thickness. Ultraviolet-absorbing materials may also be included in the supports or as a separate layer on the supports if desired.

The silver halide emulsions useful in this invention are well known to those skilled in the art and are described in *Product Licensing Index*, Vol. 92, December, 1971, publication 9232, p. 107.

The properties of the adhesive compositions used to bond the film unit are particularly important, i.e., they must have an extremely good shelf life at about 25° C. and 40–60% relative humidity, be non-blocking as tested by ASTM D1146 at 38° C. and be non-photoactive and produce seals of consistent quality. The particular polyester adhesives of this invention satisfy all of these critical requirements.

In another embodiment of the present invention, the adhesive compositions described herein are useful in laminated structures which are useful in a variety of applications including photographic cover sheets, sound recording tape, plastic glazing material, protective coatings, etc.

Typically, laminated structures comprise a support or base material which can be woven fabrics of natural and/or synthetic fibers; fibrous non-woven structures such as paper and cardboards; metal sheets such as aluminum and steel; blockplate such as tinplate or steel; leather; wood, particularly plywood or composition board; polymers such as polyethylene terephthalate, polyethylene, poly(vinyl chloride), poly(vinylidene chloride) and the like; rubber and synthetic rubber; cellular structures such as cellular polystyrene and cellular cellulose acetate; woven and non-woven sheets of glass fibers; masonry structures such as cement or cinder blocks; glass; etc. Preferred supports include polystyrene, cellulose acetate and poly(ethylene terephthalate).

The adhesive compositions disclosed herein are coated on supports in a concentration of from about 8 grams to about 24 grams per square meter of support, bonding it to a suitable layer which may be the same or different as the support material. Preferably, the adhesives are used to bond hydrophilic support materials to hydrophobic layers, such as polyethylene terephthalate to cellulose acetate butyrate and the like.

Polyester adhesive layers in the laminated structure of the present invention can be applied to either support or other layer from water or suitable organic solvents, as disclosed, hereinabove and the like by spraying, brushing, dipping or other coating techniques. Typically, the solvent is removed from the adhesive layer by drying so that this layer is in the form of a substantially homogeneous coating upon one or the other or both of the layers to be laminated together. Lamination can then be carried out conveniently in the conventional manner by applying heat and pressure to the composite structure, thereby softening the adhesive layer and producing a strong bond between the layer of support and the other layer. An alternative procedure involves forming preformed homogeneous thin films upon the surface from which they may be readily stripped, the cast films being poured from solvent solutions of the polymeric adhesive or from hot melts of the adhesive. After formation and solidification of the polyester adhesive layer in the form of thin films, these films may then be interpersed between as many layers as desired to form a composite which is laminated together by application of heat and pressure. The following examples illustrate how the polyester adhesives of the present invention may be prepared.

Example 1

Poly[1, 4-cyclohexylenebis (oxyethylene)-cosodioiminobis(sulfonyl-m-benzoate)-co-succinate]

A mixture of dimethyl sodioiminobis(sulfonyl-m-benzoate) (13.0 g 0.03 mole), diethyl succinate (12.2 g 0.07 mole) and 1,4-bis(2-hydroxyethoxy)cyclohexane (35.1 g 0.172 mole) was placed in a polymerization flask, flushed with nitrogen and heated in a bath at 235° C. The catalyst, tetra-iso-propyl orthotitanate (1 drop/0.1 mole of total charge), was added after about 4 hours when a homogeneous melt had been attained and alcohols had been allowed to distill. Under vacuum and continued application of heat, the melt was stirred as polymerization proceeded. After polymerization, the resulting polymer was cooled to room temperature. The inherent viscosity was 0.33.

Examples 2–42

Polyester Adhesives

Tables I, II and III identify the materials used to prepare the adhesives of Examples 2–42, listed in Table IV in a procedure similar to that used in Example 1.

TABLE I

| | Diols Employed in Preparing the Polymers of Table IV |
|---|---|
| BC | 1,4-Bis(2-hydroxyethoxy)cyclohexane |
| $C_2$ | Ethylene Glycol |
| NG | Neopentyl Glycol |
| $C_6$ | Hexamethylene Glycol |
| DG | Diethylene Glycol |
| TG | Triethylene Glycol |
| 4G | Tetraethylene Glycol |
| CHD | 1,4-Cyclohexane Dimethanol |

TABLE II

| Nonionic Carboxylates Employed in Preparing the Polymers of Table IV | |
|---|---|
| SUC | Diethyl Succinate |
| MAL | Diethyl Malonate |
| ADIP | Diethyl Adipate |
| SEB | Diethyl Sebacate |
| DT | Dimethyl Terephthalate |
| DIT | Dimethyl Isophthalate |
| DPB | Dimethyl 1,4-Piperazinylenebis-(carbonyl-p-benzoate) |
| DP | Diethyl o-Phenylenebisacrylate |
| CM | Cinnamylidenemalonate |

TABLE III

| Ionic Carboxylates Employed in Preparing the Polymers of Table IV and V | |
|---|---|
| DSB | Dimethyl Sodioiminobis(sulfonyl-m-benzoate) |
| DS | Dimethyl sodioiminobis(sulfonyl-p-benzoate) |
| DSI | Dimethyl 5-Sodiosulfoisophthalate |
| DPSB | Dimethyl Potassioiminobis(sulfonyl-m-benzoate) |
| DSSI | Dimethyl 5-(4-Sodiosulfophenoxy)-isophthalate |
| DTPI | Dimethyl 5-[N-(p-Tolysulfonyl)-N-potassiosulfamoyl]isophthalate |
| DISB | Dimethyl Iminobis(sulfonyl-m-benzoate) |

TABLE IV

| Example | Diol(s) /Mole % | Non-Ionic Carboxylate(s) /Mole Percent | Ionic Carboxylate /Mole Percent | Inherent Viscosity |
|---|---|---|---|---|
| 2 | BC/90 DG/10 | SUC/70 | DSB/30 | 0.40 |
| 3 | BC/100 | SEB/70 | DSB/30 | 0.45 |
| 4 | BC/100 | SUC/70 | DSB/30 | 0.20 |
| 5 | BC/90 $C_2$/10 | SUC/70 | DSB/30 | 0.30 |
| 6 | BC/50 DB/50 | SUC/65 DP/20 | DSB/15 | 0.75 |
| 7 | BC/100 | SUC/60 DP/20 | DSB/20 | 0.30 |
| 8 | BC/50 $C_2$/50 | DT/70 | DSB/30 | 0.21 |
| 9 | BC/65 CHD/35 | SUC/70 | DSB/30 | 0.28 |
| 10 | BC/100 | SUC/80 | DSB/20 | 0.31 |
| 11 | BC/100 | SUC/65 DP/20 | DSB/15 | 0.44 |
| 12 | BC/36 NG/14 | SUC/70 | DSB/30 | 0.30 |
| 13 | BC/50 DG/50 | SUC/65 DP/20 | DSB/15 | 0.58 |
| 14 | BC/100 | MAL/70 | DSB/30 | 0.23 |
| 15 | BC/100 | SUC/65 CM/20 | DSB/15 | 0.24 |
| 16 | BC/50 TG/50 | SUC/65 DP/20 | DSB/15 | 0.59 |
| 17 | BC/100 | SUC/65 DP/20 | DSB/15 | 0.51 |
| 18 | BC/100 | SUC/70 CP/10 | DSB/20 | 0.46 |
| 19 | BC/50 TG/50 | SUC/70 | DSB/30 | 0.16 |
| 20 | BC/90 DG/10 | SUC/60 DP/10 | DSB/30 | 0.26 |
| 21 | BC/100 | SUC/70 DT/15 | DSB/15 | — |
| 22 | BC/80 $C_2$/20 | SUC/60 DP/10 | DSB/30 | 0.28 |
| 23 | BC/80 DG/20 | SUC/60 DP/10 | DSB/30 | 0.25 |
| 24 | BC/30 $C_2$/20 | SUC/70 DP/10 | DSB/20 | 0.36 |
| 25 | BC/100 | DPB/70 | DSB/30 | 0.23 |
| 26 | BC/100 | DT/70 | DSB/30 | 0.25 |
| 27 | BC/100 | DIT/ | DSB/ | 0.51 |
| 28 | BC/100 | DIT/70 | DSB/30 | 0.28 |
| 29 | BC/100 | SUC/85 | DSB/15 | 0.46 |
| 30 | BC/100 | SUC/35 MAL/35 | DSB/30 | 0.24 |
| 31 | BC/90 $C_2$/10 | SUC/75 DP/20 | DSB/15 | 0.41 |
| 32 | BC/80 $C_2$/20 | ADIP/60 DP/10 | DSB/30 | 0.30 |
| 33 | BC/100 | SUC/75 | DSB/25 | 0.35 |
| 34 | BC/100 | SUC/35 ADIP 35 | DSB/30 | 0.38 |
| 35 | BC/100 | DIT/70 | DSSI/30 | — |
| 36 | BC/100 | SUC/70 | DS/30 | 0.33 |
| 37 | BC/100 | SUC/70 | DSB/29 DISB/1 | 0.38 |
| 38 | BC/100 | SUC/70 | DPSB | 0.54 |
| 39 | BC/100 | ADIP/70 | DSB/30 | 0.34 |
| 40 | TG/100 | SUC/70 | DSB/30 | 0.24 |

TABLE IV-continued

| Example | Diol(s) /Mole % | Non-Ionic Carboxylate(s) /Mole Percent | Ionic Carboxylate /Mole Percent | Inherent Viscosity |
|---|---|---|---|---|
| 41 | DF/50 $C_6$/50 | SUC/70 | DSB/30 | 0.21 |
| 42 | 4G/100 | SUC/70 | DSB/30 | 0.30 |

Example 43

Bonding Strength Comparisons

This is a comparative example of bonding strengths, which are illustrated by peel strength tests of adhesives of the present invention compared to conventional adhesives of the prior art.

Polyester adhesives of the prior art and of the present invention were evaluated as adhesives by the following procedures.

A homogeneous solution of five grams of the polyester adhesive in 25 ml of water was coated on 2.5 or 4 mil poly(ethylene terephthalate) subbed with a latex copoly(acrylonitrileco-vinylidene chloride-co-acrylic acid) (15:79:6) at a wet coating thickness of 4 mils. The resulting coating was dried for 2 hours at 85° C. and heat sealed under 40 psi pressure to various substrates. Light-sensitive adhesives were exposed for 2 minutes to a 200 watt high pressure mercury vapor light source before the sealing operation.

EQUIPMENT

The peel equipment consisted of a cylindrical test drum mounted on four Teflon nesting rollers. The drum was made of ceramic or metal and was surfaced with any desired material such as a sheet of cellulose acetate. It rotated freely on the rollers and was heated with an axially positioned 2000 watt, General Electric 2M/T3/1CL 230–250 v, quartz infrared lamp. This equipment was mounted on the moving crosshead of an Instron Tensile Testing Machine. The surface temperature of the drum was controlled by several means including a Cole-Parmer thermistor probe and a YS1 Model 72 Proportional Temperature Controller. The temperature of the surface was measured by a thermocouple and was displayed by a Data Technology Corporation Millivolt Meter.

Peel Strips

The test strips which were peeled from the drum consisted of an adhesive coated on sheets of poly(ethylene terephthalate). The coatings were normally 0.5 or 1 mil thick. A strip ½ inch wide and about 12 inches long was cut from the sample after drying or cooling.

A Typical Peel Experiment

In preparation for a peel experiment the drum was heated to the desired temperature and a test strip was wrapped circumferentially around it with the adhesive side down on the drum. The bonding conditions used depended on the data that were sought, but in all cases a mechanically actuated, heated 1.5 Kg bonding roller was passed at 1"/min. (2.54 cm/min.), over the test strip. The goal was to achieve a defect-free bond of the adhesive to the drum.

One end of the test strip was then attached to the Instron load cell and the temperature was adjusted to the desired point. The test was carried out by traversing the crosshead of the Instron downwards, at the desired rate, for a distance of about 1 inch (2.54 cm). The drum rotated as the test strip was peeled from it so that the peel angle remained constant at 90° C.

The force required to peel the strip from the drum was recorded by a strip chart recorder which ran at 10 inches (25.4 cm) per minute. Thus, on completing a measurement at one temperature, one has a recording of force in grams vs. time. Rates of 12′/min. (30.5 cm/min.) and 0.1′/min. (0.254 cm/min.) at temperatures of 70° C., 50° C. and 25° C. were used.

Results are recorded in the following Table VI. The key to the table is as follows:

(A)—Adhesive failure
(C)—Cohesive failure
(SS)—Slip-stick failure (adhesive and cohesive failure)
The polyester support broke
(cpm)—centimeter per minute The following control adhesives of Table V were prepared using procedures similar to the method used in Example 1.

TABLE IV

| Control | Diol(s) /Mole % | Non-Ionic Carboxylate(s)/ Mole % | Ionic Carboxylate/ Mole % | Viscosity |
|---|---|---|---|---|
| A | BC/100 | SUC/65 DP/25 | DSB/10 | 0.40 |
| B | BC/100 | SUC/60 | DSB/40 | 0.34 |
| C | BC/100 | SUC/50 | DSB/50 | 0.22 |
| D | BC/100 | SUC/70 | DSSI/30 | 0.27 |
| E | BC/100 | SUC/70 | DSI/30 | 0.23 |

TABLE VI

| | Bond | Peel Strength | | | | | | | |
|---|---|---|---|---|---|---|---|---|---|
| | Temp. | 25° C. | | 50° C. | | 70° C. | | Bonding Temp. | |
| Reference | ° C. | 0.25 cpm | 30.5 cpm | 0.25 cpm | 30.5 cpm | 0.25 cpm | 30.5 cpm | 0.25 cpm | 30.5 cpm |
| Control A | 90 | — | 4000 B | 520 C | 2520 C | 90 C | 1160 C | 50 C | 240 C |
| Control B | — | — | 300 | — | — | — | 15 | — | — |
| Control C | — | — | 20 | — | — | — | 10 | — | — |
| Control D | 120 | — | 30 | — | — | | 10 | — | — |
| Control E | 120 | 74 A | 70 A | 64 A | 66 A | 60 H | 66 A | 70 A | 70 A |
| Example 5 | 90 | 1600 A | 260 A | 2000 SS | 800 A | 900 C | 1600 A | 66 C | 2000 A |
| Example 34 | 90 | 2400 B | 1500 B | 1800 C | 2000 B | 160 C | 2200 SS | 40 C | 1200 C |
| Example 36 | 120 | 360 SS | 1380 C | 1380 C | 480 C | 1740 C | 1160 A | 446 C | 1920 A |
| Example 37 | 120 | 130 A | 2080 C | 530 C | 440 C | 2820 C | 2680 A | 900 C | 1380 A |
| Example 39 | 120 | 3560 C | 2400 C | 1040 C | 1180 C | 104 C | 1920 C | 40 C | 650 C |
| Example 18 | 120 | 2360 AB | 2280 AB | 1800 A | 2000 B | 840 C | 1760 A | 250 C | 1780 A |
| Example 41 | 100 | 2640 B | 2600 B | 2280 A | 1400 B | 140 C | 1360 A | 50 C | 450 C |

Control A is illustrative of polyesters prepared with an acid component having less than 15 mole percent of a dicarboxylic acid having an iminosulfonyl moiety. Such polyesters are undesirably tacky and also exhibit poor bonding strengths at elevated temperatures. Control B and C are polyesters prepared with more than 35 mole percent of the iminosulfonyl-containing diacid. These polyesters exhibit extremely poor bonding strengths at all temperatures, possibly due to their semi-crystalline nature.

Controls D and E are representative polyesters of the prior art wherein the iminosulfonyl-containing diacid was replaced with dimethyl 5-(4-sodiosulfophenoxy)isophthalate and dimethyl 5-soidiosulfoisophthalate, respectively. As indicated by the low peel strengths in Table VI, these polyesters have poor bonding strengths at all temperatures.

On the other hand, polyester adhesives within the scope of the present invention exhibit much stronger bonding strengths, even at elevated temperatures.

Example 44

PREPARATION OF AN IMAGE TRANSFER UNIT

A photographic image transfer unit or element was prepared as described in U.S. patent application Ser. No. 676,947 of Hannie et al., filed Apr. 14, 1076 by the following procedure.

A 10% solution of poly[1,4-cyclohexylenebis(oxyethylene)-co-1,4-cyclohexylenedimethylene sodioiminobis(sulfonyl-m-benzoate)-co-succinate (30:70 acid ratio)] (similar to the polyester of Example 1) in water was coated onto both sides of two separate pieces of poly(ethylene terephthalate) film support at a coverage of 1.2 g/ft$^2$ (12.96 g/m$^2$).

The resulting coated supports were cut to form spacer rails, i.e., rectangular frames of poly(ethylene terephthalate) having adhesive on both sides. Each spacer rail was ultrasonically laminated to a masking layer of an integral negative receiver element. The ultrasonic sealing apparatus causes the adhesive to melt under pressure. The integral negative receiver was prepared as described in U.S. Ser. No. 676,047 mentioned hereinabove and affixed at layer 12 described therein (the gelatin overcoat) to a mask of poly(ethylene terephthalate) having carbon therein and having a rupturable pod containing a processing composition for the completed photographic element attached thereto.

After cooling this assembly, the exposed surfaces of the spacer rails were dielectrically sealed to cover sheets by contacting the spacer rails and the outermost timing layers of the cover sheets for 0.2 seconds at 129° C. and 40 psi (2070 mmHg) and cooling to form a completed photographic element.

These units were stored at ambient conditions for one month. Other units prepared in similar fashion were incubated at temperatures ranging from 10° F. (−12° C.) to 180° F. (82° C.). None of these units showed any delamination due to failure of the adhesives.

Other image transfer units were similarly prepared and then exposed to light and processed by passing them through pressure rollers to break the pods of processing solutions and to spread the solutions evenly within the spacer rails. High quality images were obtained with each unit and no leakage of processing solution was evident as the adhesives held firmly.

The invention has been described in detail with particular reference to certain preferred embodiments thereof, but it will be understood that variations and modifications can be effected within the spirit and scope of the invention.

We claim:

1. An adhesive composition comprising a water-soluble polyester which comprises:

A. a glycol component comprising at least 50 mole percent of an aliphatic diol selected from the group consisting of HO—R—H wherein R is $-(CH_2CH_2O)_n-$, and

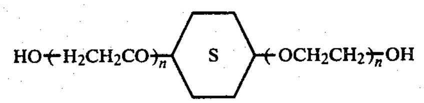

wherein n is an integer from 1 to 4; and

B. an acid component comprising greater than 15 and up to about 35 mole percent of at least one dicarboxylic acid having an iminosulfonyl moiety containing a monovalent cation as an imino nitrogen atom substituent; and from about 65 to about 85 mole percent of one or more other diacids.

2. The adhesive composition of claim 1 wherein the polyester has an inherent viscosity within the range of from about 0.15 to about 0.90 at 25° C. in a 1:1 mixture of phenol and chlorobenzene.

3. The adhesive composition of claim 1 wherein the polyester has a glass transition temperature within the range of from about 20° to about 50° C.

4. The adhesive composition of claim 1 wherein the polyester glycol component comprises at least 50 mole percent of 1,4-bis(2-hydroxyethoxy)cyclohexane.

5. The adhesive composition of claim 1 wherein the polyester acid component comprises greater than 15 and up to about 35 mole percent of at least one dicarboxylic acid containing a moiety having the formula

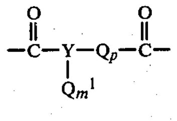

wherein m and p are integers whose sum equals 1;

Q is defined by the formula

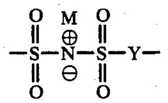

$Q^1$ is selected from the group consisting of

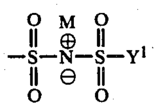
and
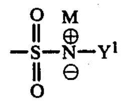

wherein Y is arylene or arylidene; $Y^1$ is selected from the group consisting of aryl and alkyl; and M is a solubilizing cation.

6. The adhesive composition of claim 5 wherein the polyester acid component comprises from about 25 to about 30 mole percent of dimethyl sodioiminobis(sulfonyl-m-benzoate).

7. An adhesive comprising a water-soluble polyester having an inherent viscosity within the range of about 0.15 to about 0.90 at 25° C. in a 1:1 mixture of phenol and chlorobenzene and a glass transition temperature within the range of from about 20 to about 50° C., the polyester comprising:

A. a gylcol component comprising at least 50 mole percent of 1,4-bis(2-hydroxyethoxy) cyclohexane; and B. an acid component comprising from about 25 to about 30 mole percent of dimethyl sodioiminobis(-sulfonyl-m-benzoate) and from about 70 to about 75 mole percent of succinic acid.

* * * * *